Aug. 8, 1950 B. H. CLEM ET AL 2,518,224

AUTOMATICALLY CONTROLLED OSCILLATING ELECTRIC INCUBATOR

Filed Sept. 18, 1946 8 Sheets-Sheet 1

Inventor

B. H. Clem
and J. W. Flaig,

By Lester L. Sargent

Attorney

AUTOMATICALLY CONTROLLED OSCILLATING ELECTRIC INCUBATOR

Filed Sept. 18, 1946

Inventor
B. H. Clem
and J. W. Flaig.
By Lester L. Sargent
Attorney

Inventor
B. H Clem,
and J. W Flaig
By Lester L Sargent
Attorney

AUTOMATICALLY CONTROLLED OSCILLATING ELECTRIC INCUBATOR

Filed Sept. 18, 1946. 8 Sheets-Sheet 4

Inventor
B. H. Clem
and J. W. Flaig

By Lester L. Sargeant
Attorney

AUTOMATICALLY CONTROLLED OSCILLATING ELECTRIC INCUBATOR

Filed Sept. 18, 1946 8 Sheets-Sheet 5

Inventor
B. H. Clem
and J. W. Flaig,
By Lester L. Sargent
Attorney

Inventor
B. H. Clem
and J. W. Flaig,
By Lester L. Sargent
Attorney

Aug. 8, 1950 B. H. CLEM ET AL 2,518,224

AUTOMATICALLY CONTROLLED OSCILLATING ELECTRIC INCUBATOR

Filed Sept. 18, 1946 8 Sheets-Sheet 7

Inventor

B. H. Clem and J. W. Flaig

By Lester L. Sargent

Attorney

Aug. 8, 1950 B. H. CLEM ET AL 2,518,224

AUTOMATICALLY CONTROLLED OSCILLATING ELECTRIC INCUBATOR

Filed Sept. 18, 1946 8 Sheets-Sheet 8

Inventor

B. H. Clem
and J W Flaig,

By Lester L. Sargent

Attorney

Patented Aug. 8, 1950

2,518,224

UNITED STATES PATENT OFFICE 2,518,224

AUTOMATICALLY CONTROLLED OSCILLATING ELECTRIC INCUBATOR

Benjamin H. Clem and John W. Flaig, New Madison, Ohio

Application September 18, 1946, Serial No. 697,664

5 Claims. (Cl. 119—37)

This application is a continuation in part of application Serial 269,730, filed April 24, 1939, and of Serial 396,506, filed June 3, 1941, each now abandoned.

The object of our invention is to provide certain improvements over prior Patent 2,078,443, Clem, and also to describe and claim certain novel details of construction and operation; to provide novel means for intermittently oscillating the egg container to turn the eggs at specified intervals by a mechanism electrically actuated and controlled by a clock, and to accomplish this at the specific intervals which after much experimentation have been found to produce the best results; also to provide timing means and a novel mercury switch, and wiring connecting same with means for reversing the oscillation of the egg container at the intermittent predetermined intervals desired—the egg container remaining stationary at other times.

It is also an object of our invention to provide novel means for regulating and maintaining the proper temperature in the interior of the incubator; and to provide a combination of electrically actuated cooperating mechanisms for automatically controlling the temperature.

We attain these and other objects of our invention by the mechanism illustrated in the drawings, in which—

Figure 2:
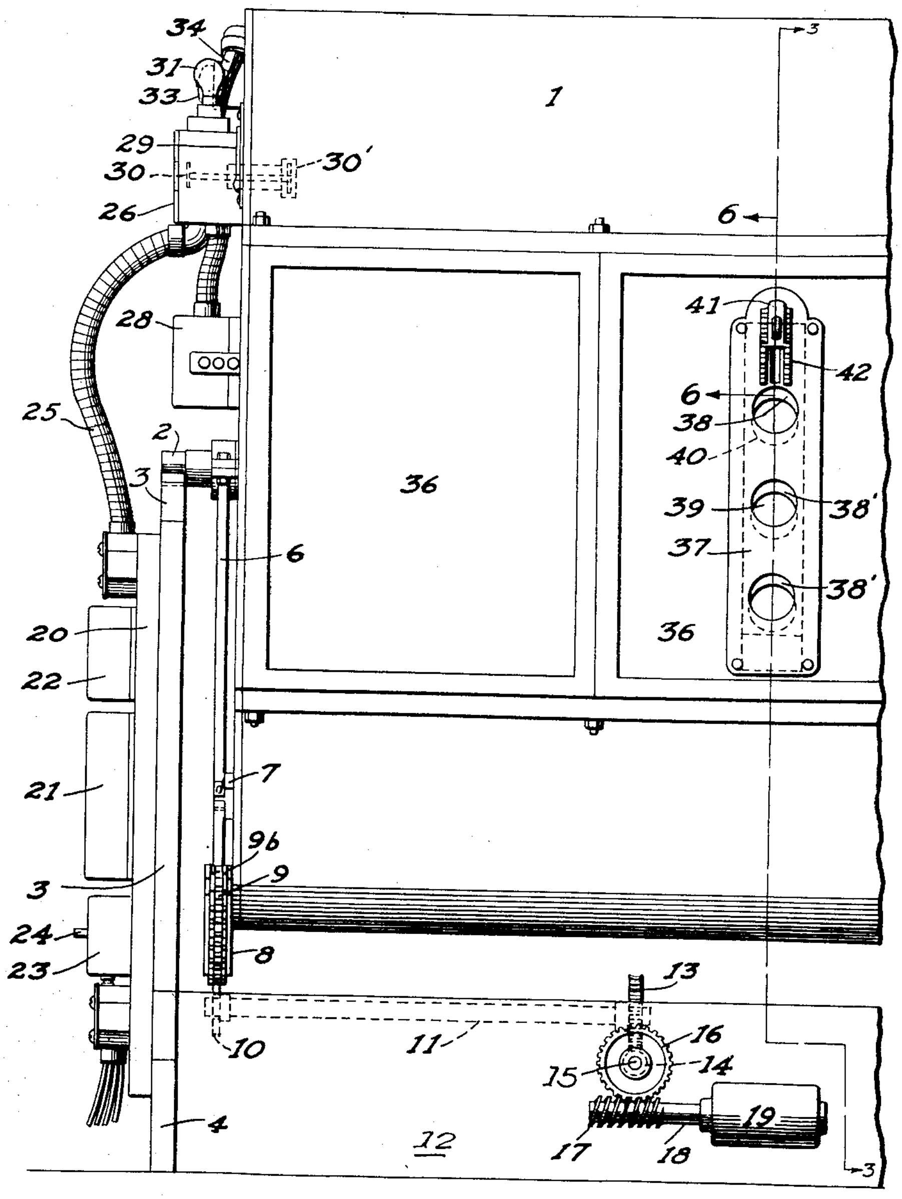
Fig. 2 is a side elevation of the incubator, a portion being broken away for lack of space.

Referring to the accompanying drawings, we provide an approximately cylindrical incubator body 1, swingably supported on a central shaft 2, the ends of which are mounted on end supports 3, which terminate at their lower ends in bases 4 at each end of the incubator. At one end of the incubator are bearings 5 bolted around the shaft 2 and from which extend radial bars 6 which are secured to the end of the incubator by the fastening members 7, the bars 6 in turn being integral with the arcuate bar 8. Mounted on the arcuate bar 8 is a roller bearing chain 9 which may be adjustably secured to the arcuate bar by suitable means, as by the clamp 9b and screw 9a shown in detail in Fig. 7. The sprocket 10 meshes with the chain 9 to operate the arcuate bar and thus swing the incubator 1 on its axis 2. Sprocket 10 is mounted on a rod 11 which extends longitudinally of the body of the incubator and which in turn carries a worm wheel 13, as shown in Fig. 2, this worm wheel 13 meshing with a worm 14 disposed at right angles thereto and driven by shaft 15 and worm wheel 16, which meshes with worm 17 on motor shaft 18, driven by motor 19. Motor 19 is a reversing motor.

Figure 1:
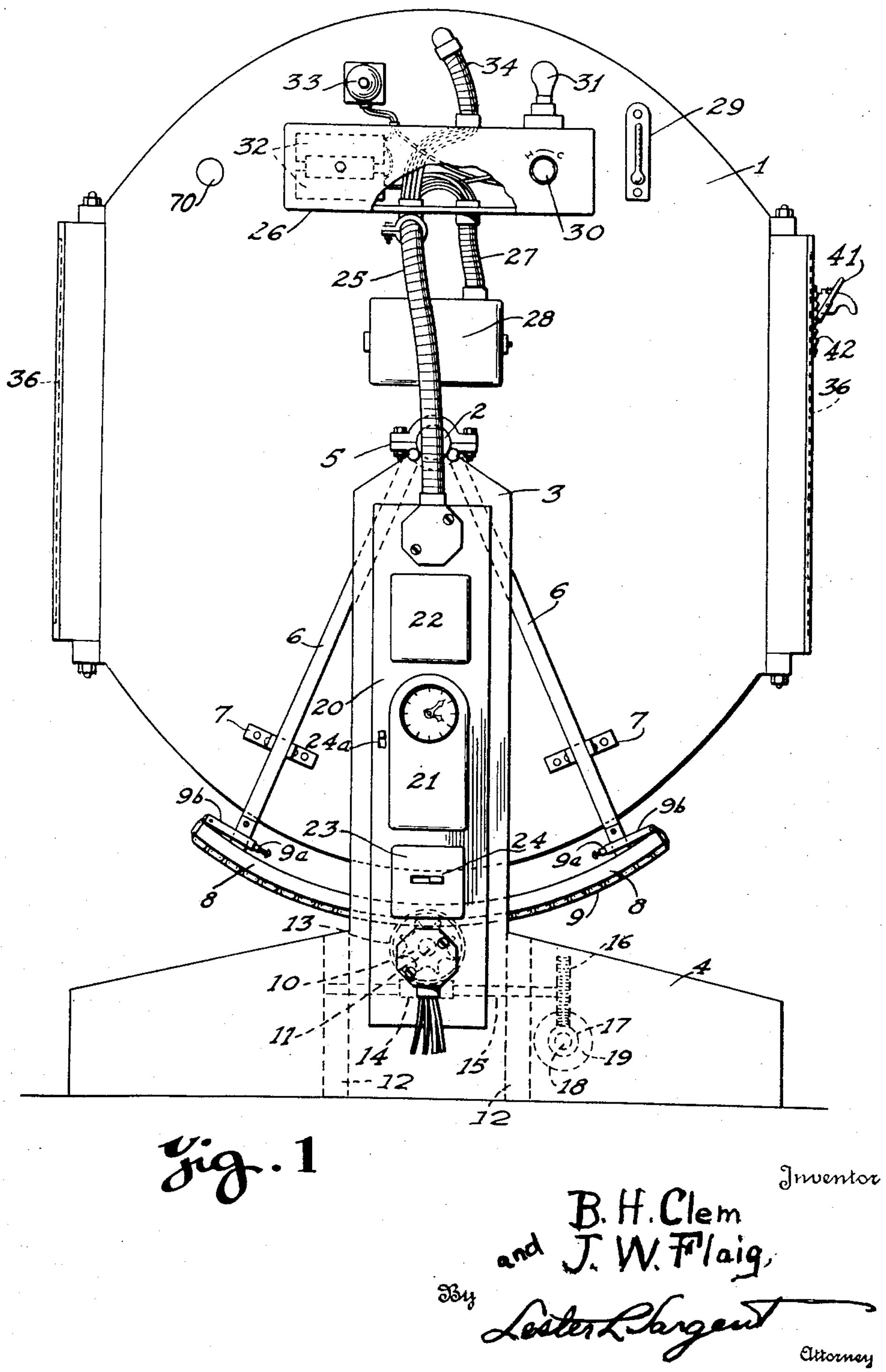
Figure 1 is an end elevation of the incubator.
Figure 4:
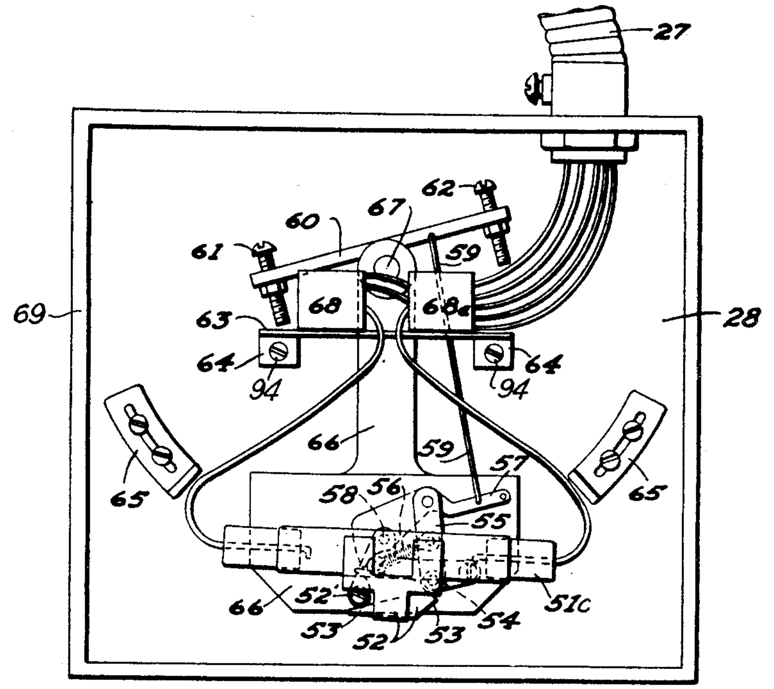
Fig. 4 is a front elevation of the mercury switch mounted in its cabinet; this switch being for reversing the motor.
Figure 5:
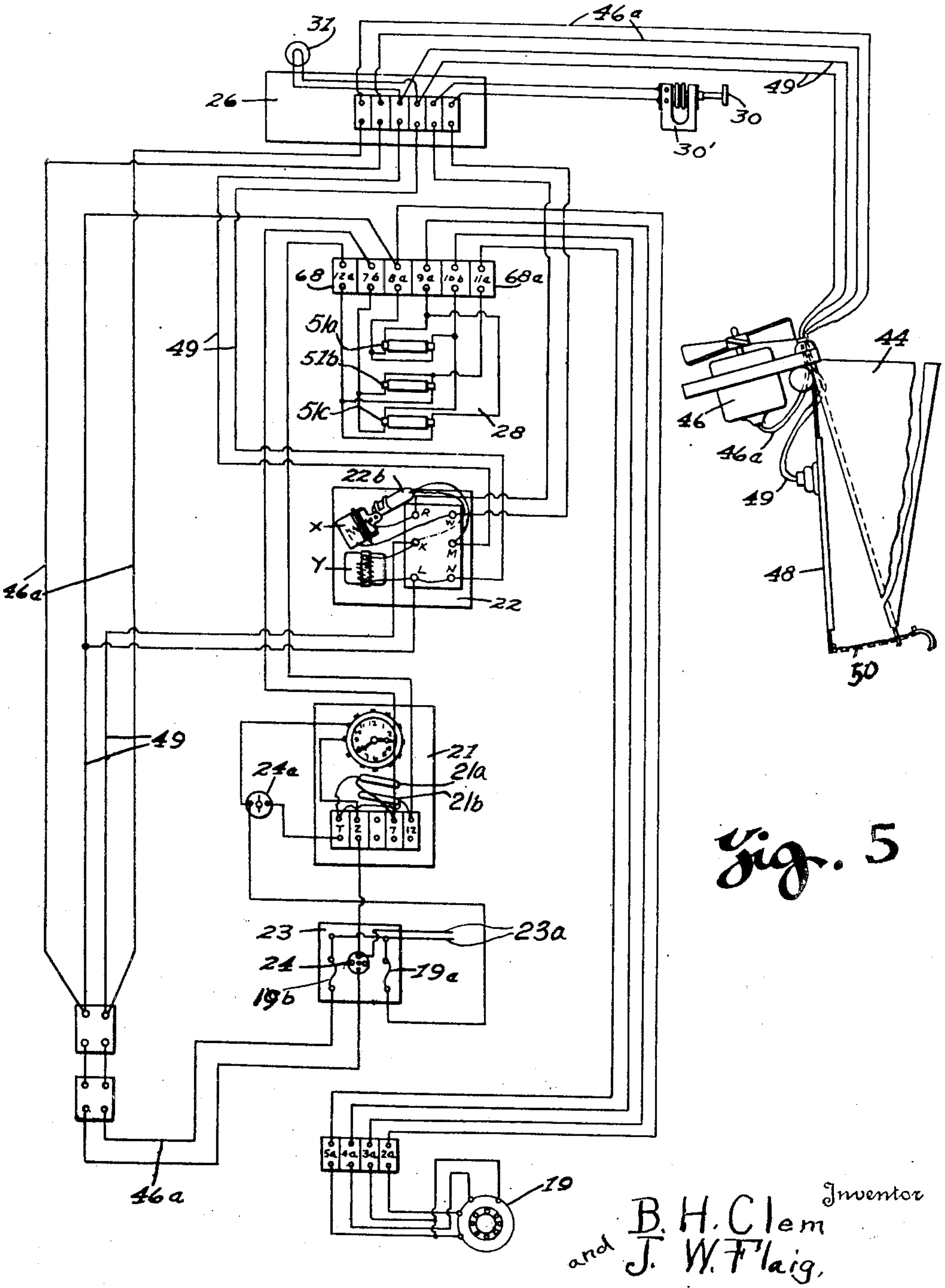
Fig. 5 is a diagrammatic view of the electric circuits in the incubator; except details of the clock and switch mechanism shown in Fig. 10.
Figures 7, 9, 10, 11:
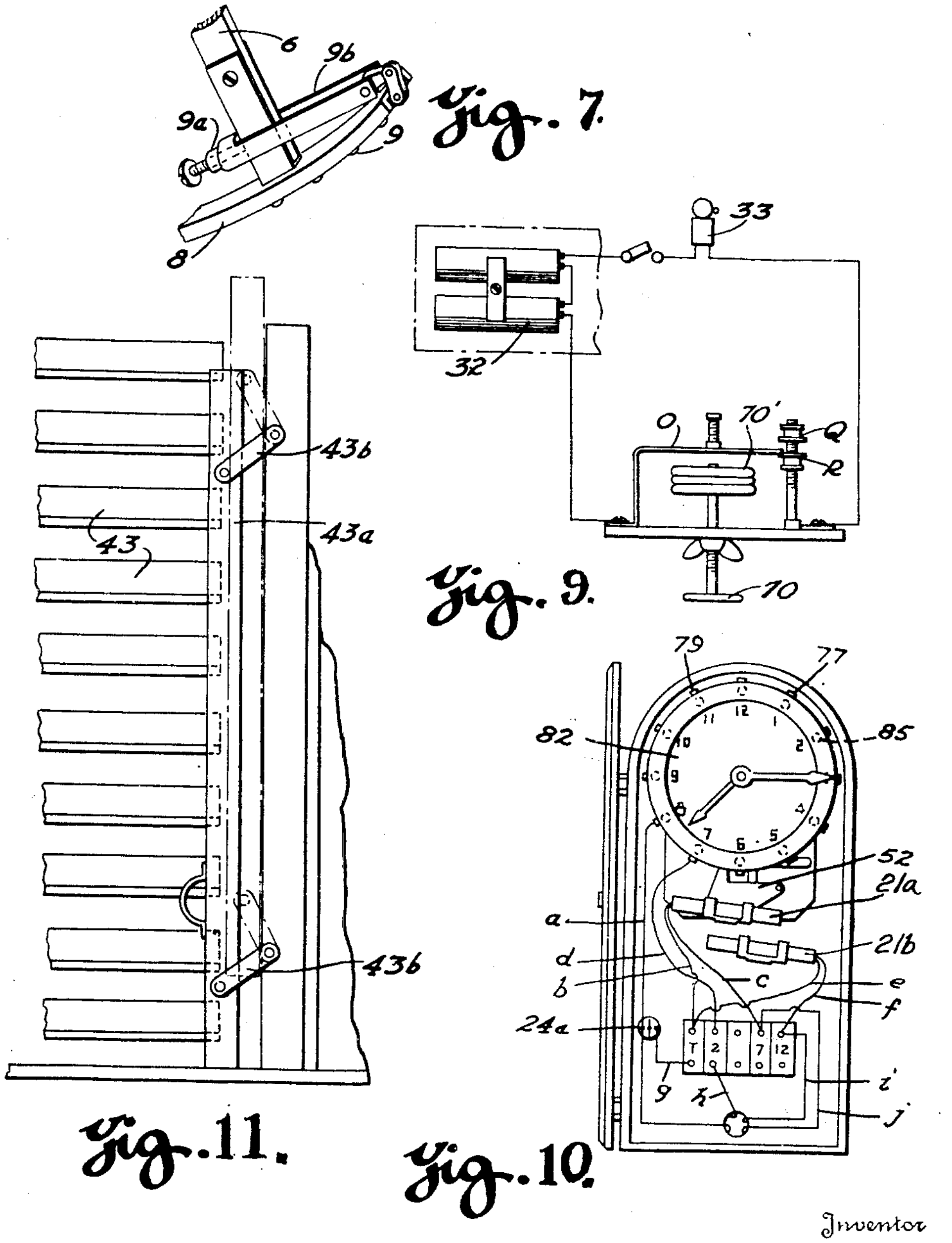
Fig. 7 is a detail perspective view of the device for adjusting chain 9.
Fig. 9 is a view partly in elevation and partly in diagram of the temperature alarm circuit to be used with dry cells to make it independent of regular current supply.
Fig. 10 is a front elevation of the clock and the mercury starting switch for the reversing motor.
Fig. 11 is a front elevation of the portion of the egg trays and of the arms which control the trays.

Mounted on one of the end supports 3, as shown in Fig. 1, is a panel 20 carrying a time clock 21, a thermostat relay switch 22, a main switch 24, lead-in switch box 23, containing fuse racks, and a switch 24a to stop the reversing motor at the will of the operator. Fuse 19b, located on the lower left-hand portion of part 23, as seen in Fig. 5, is an incubator or heater line fuse; and fuse 19a on the lower right-hand portion of part 23, is a motor or turner circuit fuse. Switch 24a closes or opens the circuit ahead of the mercury tubes 21a and 21b in the time clock 21, and is shown in Figs. 1, 5 and 10. Switch 24a when closed is connected in series with the reversing motor 19 and the motor circuit through the switching mechanism hereinafter described. The flexible electric conduit 25 carries the wires from the mechanism on panel 20 to the terminal box 26 which is mounted on the incubator. Part of the wires then pass through conduit 27 to the reversing switch 28, the complete mechanism of which is shown in detail in Figs. 4 and 12 to 14. The switch mechanism 28 includes three mercury switches 51a, 51b and 51c which serve to interrupt the motor circuit when a predetermined degree of inclination of the incubator has been attained and which also serve to change the current path in the motor circuit, both of these functions being hereinafter more fully explained. For convenience in illustration the switches 51a, 51b and 51c are shown diagrammatically—one above the other in Fig. 5, although actually they are horizontally aligned as indicated in Fig. 4.

The two mercury switches 21a and 21b shown in Fig. 10 are arranged in the time clock which controls the periodic starting of the motor. A thermometer 29 is mounted in one end of the incubator.

Mounted within the terminal box 26 and extending into incubator 1 is a heat control thermostat 30′, which can be turned to the right, as viewed in Fig. 1, to decrease the temperature and to the left to increase the operating temperature in the incubator. Manual adjustment of this thermostat is made by means of the disk-like handle 30.

The part 34 (Fig. 1) designates a conduit carrying wires from terminal box 26 to the interior of the incubator to the fan motor and heating elements.

The incubator body 1 has a series of side panels or doors 36. On the central side panel is mounted an outer ventilating panel 37 having spaced openings 38 which may be opened and closed by a ventilator slide 39. Slide 39 has corresponding openings 40 adapted to be moved into or out of registration with the openings 38 of the outer ventilator panel. Any desired number of register openings 38 and 40 may be provided. The back of panel 37 is recessed sufficiently to receive the ventilator slide 39 and to provide for its movement from open to closed position.

Figure 6:
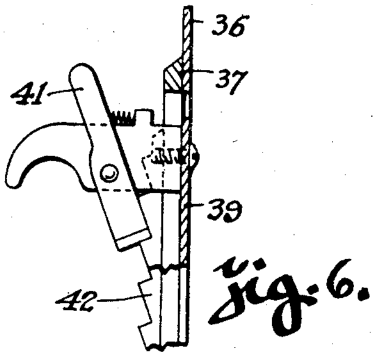
Fig. 6 is an enlarged detail vertical section of the latch mechanism 41 taken on line 6—6 of Fig. 2.

Referring to Figs. 2 and 6, a spring pressed latch 41 is attached to the upper end of the ventilator slide 39. The spring of said latch holds it in releasable but in normal latching engagement with the racks 42 on outer ventilator panel 37, whereby the ventilator slide is normally held in whatever position it is moved to.

Contained within the incubator is a water tank 44 secured to a frame 44a, the frame being swingably suspended from the central shaft 2 by which it is supported. A suitable bracket 45 which is integrated with the frame 44a and is also supported from the central shaft 2 carries the electric motor 46 to which current is supplied by wires 46a, and which operates an electric fan 47 which maintains a constant circulation of heated, moistened air in the incubator as indicated by the arrows. The apparatus, just described, is freely suspended from the central shaft 2 in such a way that the weight of water in the tank 44 is counterbalanced by motor 46, fan 47 and arm 45. As the water level is reduced in the wedge-shaped tank 44 by evaporation, the tank 44, which is of suitable predetermined dimensions and weight to just balance the weight of the fan 47, motor 46 and arm 45, will be tilted upwardly and to the right, with a tendency to maintain a constant surface area of the water, whereby evaporation is constant and the desired humidity is maintained.

Figure 3:
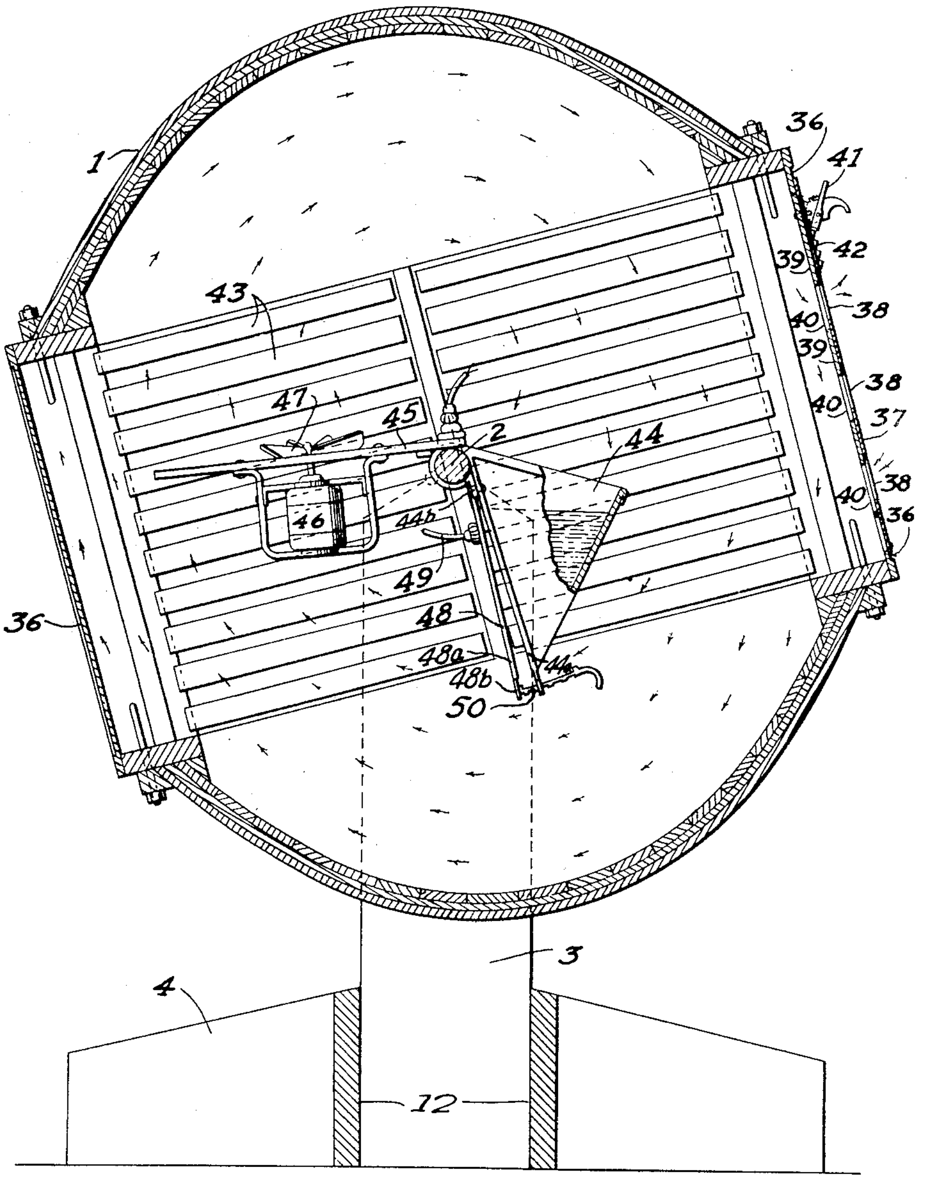
Fig. 3 is a vertical section through the incubator on line 3—3 of Fig. 2, with part of the mechanism shown in elevation.

The adjustable heating unit 48 is disposed adjacent to the water tank 44 and consists of the resistance elements 48a which are mounted on a rectangular frame 48b, as shown in Fig. 3. The frame 48b is pivotally secured to the frame 44a as at 44b. The heating element 48 is adjustably controlled as to position by a suitable notched arm or latch 50 which is secured to the frame 48b in a manner to resiliently overlie and engage the nethermost portion of frame 44a. Thus it is possible to increase or decrease the amount of humidity produced, by adjusting the distance of member 48 from tank 44 by means of the notched arm 50.

When the incubator is assembled for use, the operator sets the heating unit 48 in the desired adjusted position with relation to arm 50 in order to give the desired humidity for the particular climate where the incubator is in use. Once this adjustment is made the humidity is automatically controlled. The heater unit, adjusted relative to the water tank is only one feature in controlling the humidity. The triangular end walls of the tank are parallel and the tank tapers to a line at the bottom.

The tank is relatively wide at the top, as shown. The shape of the water tank, plus the fact that the fan and frame balance the tank of water, are contributing factors. When the tank is full the weight of the water in the V-shaped tank will balance the frame and the fan. As the water evaporates, the weight of the fan and its motor and supporting frame tilt the tank, still partially filled with water, in order that the same area at the surface of the water may be exposed to evaporation. The tilting movement of the tank also prevents the water level on the heating side of the tank from being reduced, maintaining constant heat supply to the water.

The air in the incubator also is heated by the electric heating elements 48a which are connected by wires to a source of current.

Figure 12:
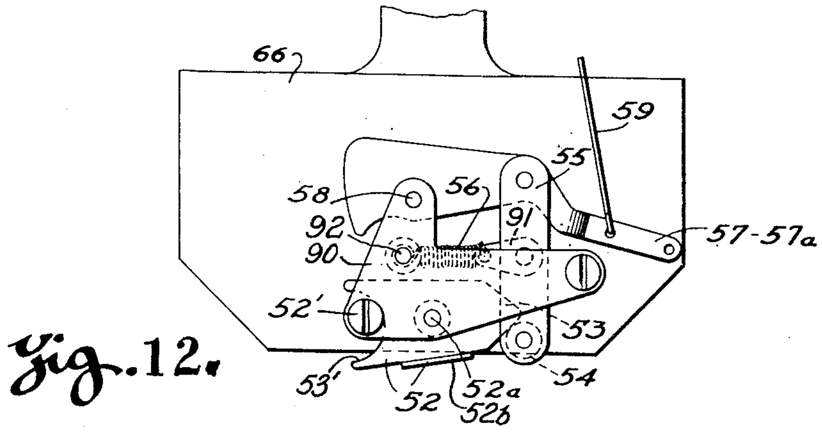
Fig. 12 is a detail front elevation of a portion of the reversing switch mechanism in one extreme position, the mercury tubes being removed.
Figure 13:
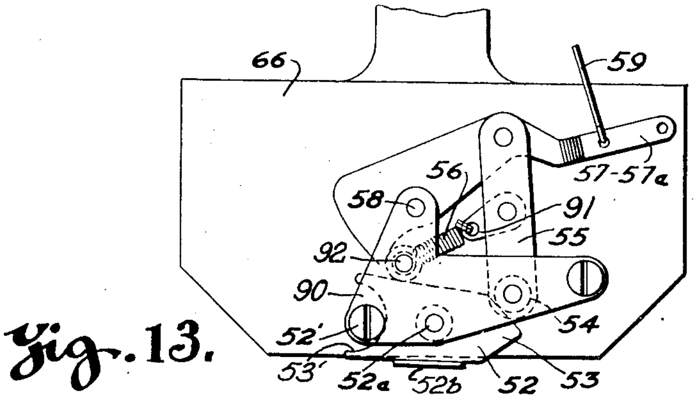
Fig. 13 is a similar view of the same portion of the reversing switch mechanism in the opposite extreme position.
Figures 14, 15, 16:
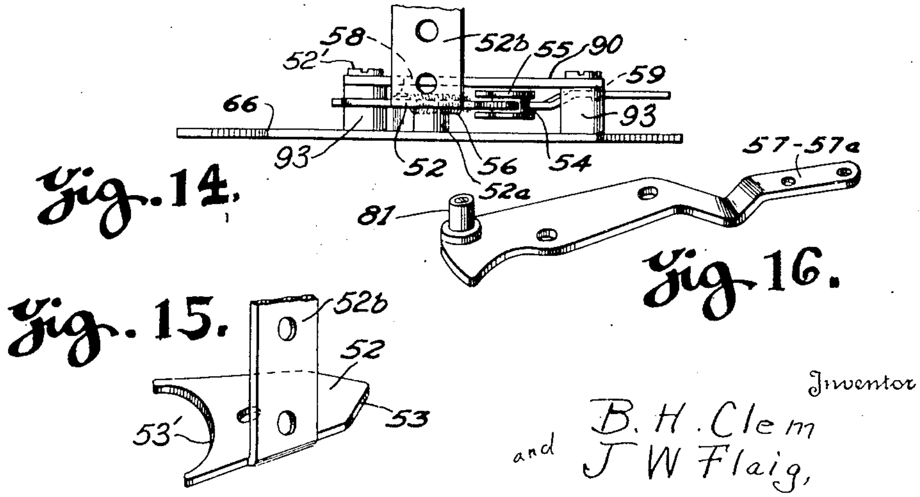
Fig. 14 is an edge elevation of the switch mechanism shown in Figs. 12 and 13.
Fig. 15 is a detail perspective view of the pivoted switch base member 52.
Fig. 16 is a detail perspective view of the pivoted switch bar 57 for the switch as shown in Figs. 12, 13, 14 and 19.

Fig. 5 illustrates diagrammatically the mechanism by means of which the periodicity and extent of oscillation of the incubator is controlled. We use a plurality of mercury switches 51a, 51b and 51c for reversing the motor, each of which have two wires at each end, as shown in Fig. 5, and are mounted in horizontal alignment on the ledge portion 52b of a pivoted base 52, which is mounted on pivot 52a, as shown in Figs. 12–14. Pivot 52a is secured to a plate 90. Base 52 has a U-shaped end 53′ which engages stop 93 to limit the movement of base 52. The opposite end of the base 52 comprises a V-shaped cam 53 which is engaged by a roller 54 mounted between the flat and spaced parallel bars 55. The roller is held in operative engagement with V-shaped cam end 53 by the tension of spring 56 which has one end thereof secured to the bars 55 by means of a pivotally mounted link 91 and has the other end thereof anchored to a spacer 92 which is secured to plate 90. Roller 54 rolls up one side and down the other side of cam end 53 to rotate the base 52 and the mercury switches mounted thereon first in one direction then in the other and thus cause the incubator body to operate first in one direction and then in the other by means of the electrical circuits hereinafter described. The plate 90 is secured to a pendulum member 66, in parallel spaced relation thereto, by means of the screws 52′ and spacers 93, one of which, as previously described, also serves as a stop.

Pivotally mounted to the other ends of parallel bars 55 is a pivoted bar 57, as shown in Figs. 12, 13 and 14, which swings about the stationary pivot 58 which is secured to the plate 90. Attached to pivoted bar 57 is a rod 59 which is secured at its other end to a pivoted bar 60 which, as shown in Fig. 4, is pivotally mounted on shaft 67. Shaft 67 is rigidly secured to casing 69. Bar 60 at its ends carries the adjustable set screws 61 and 62 which contact with the stop plate 63 which is fastened to the casing by screws 94 which extend through ears 64 formed integrally with the plate 63. The screws 61 and 62 permit adjustment of the device to control the degree of oscillation of the incubator body 1. The metal pendulum block 66 is pivotally mounted on shaft 67 and will remain in substantially vertical position during oscillation of the incubator body 1 and casing 69. Thus as the incubator body oscillates, the upwardly moving portion of bar 63 will contact one or the other of screws 61 and 62 and cause the rod 59 to move the bar 57 either upwardly or downwardly depending upon the direction of rotation of the casing 69. The stops 65 are employed initially to mark the maximum permissible swing of the pendulum 66 relative to the casing 69 so as to assist in making proper adjustment of the adjusting screws 61 and 62. After the extent of oscillation of the mechanism has been set, the stops 65 serve only to prevent the pendulum from swinging excessively during the process of handling and shipment.

The electric circuits used in our incubators are diagrammatically shown in Fig. 5 of the drawings.

When the switch arm 24 is thrown to connect the electric circuits, the signal element, such as the pilot light 31 on the incubator terminal box 26, will be connected in parallel with the resistance elements 48a. The thermostat 30′ when it expands presses against the contact 76, shown in Fig. 17, and operates a pressure sensitive switch which opens the heating circuit. When the temperature in the incubator cools, the thermostat contracts, operating the switch which closes the heating circuit.

When the heat is on, the pilot light 31 is illuminated. When the main current is off the pilot light 31 is automatically extinguished. A signal bell may be substituted if desired in place of the pilot light 31, as an equivalent element. Lead-in switch box 23 is the entrance for the lead-in wires 23a from the main or power line to main switch 24, which turns on and off the electricity which causes the machine to operate.

Switch 24a adjacent to the time clock 21 is used only to open and close the circuit to motor 19 and is employed when it is desired to interrupt the current supply to the motor 19, without disturbing the heater unit and fan motor circuits. If the circuit to motor 19 has been closed by the timer mechanism 21, in the manner hereinafter described, and the incubator body is in the process of rotation, the switch 24a may be opened to stop the rotation of the incubator at any desired position. Thus, if the operator desires to load or unload a portion of the egg trays in the incubator, he will open the switch 24a when the incubator has rotated to the position shown in Fig. 1. This is termed "tray level" position, that is, the egg trays 43 are horizontal in contrast to the tilted position shown in Fig. 3. The mechanical advantage obtained through the gear reduction arrangement of the worms and worm wheels 13, 14, 16 and 17 is great enough to prevent any free swinging by the incubator when the motor 19 is not rotating. The operator can again close the circuit to motor 19 by closing switch 24a.

Figure 8:
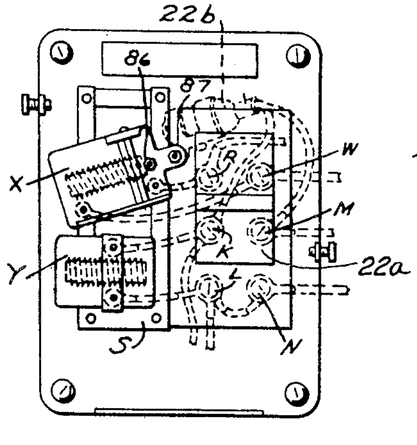
Fig. 8 is a rear plan view of the thermostat relay switch.

Fig. 8 illustrates an electric relay 22 which makes and breaks the current to electric heating elements 48a and is controlled by the thermostat 30′. Two independent insulated coils X and Y are mounted on a laminated iron yoke S. The primary coil Y is fixed in position and is connected across the high voltage line. The secondary coil X is movable and is connected to the thermostatic circuit. Secondary coil X is pivoted on pivot pin 86 and rigidly coupled to mercury switch 22b by coupling pin 87, whereby to rock mercury tube 22b to and from closed position when electric current flows through coil X. Tubes 22b and 21a—21b have two wires at one end only, as shown in Fig. 5. Coils X and Y act as a transformer inducing low voltage in the secondary coil when the primary coil is energized. When the thermostatic circuit is closed, the secondary coil instantly moves upward due to the repulsion action of the coils, and closes the mercury contact 22b. When the thermostatic circuit is opened by the thermostat 30′, shown in Fig. 17, the secondary coil X drops by gravity and opens the mercury switch contact 22b, as shown in Fig. 8. As no springs are employed, the mercury switch cannot stick. Positive contact operation is assured indefinitely. Relay 22 is a reliable low voltage mercury contact relay, which also acts as a transformer, thus eliminating the necessity of an externally connected low voltage transformer. Its unique construction does away with the hum and chatter common with clapper type relays. The relay induces its own voltage (24 volts) in the thermostatic circuit due to the incubator changes in temperature. As shown in Fig. 8, terminals K and L are connected to insulated blocks 22a and carry the current to relay 22; members M and N carry the load to electric heating elements 48a. R and W carry a low voltage to thermostat control 30′.

Fig. 9 illustrates the temperature alarm circuit. A temperature alarm bell 33 is provided on the incubator. This alarm is furnished current by two dry cell batteries 32, because in case of failure of the electric current to the incubator the dry cell batteries 32 can be relied upon. The batteries 32 have one wire connected to the thermostat arm O, and another connected through the post to the contacts Q and R. The alarm is arranged so that adjustable contacts Q and R can be set for a particular range of temperature. If the temperature in the incubator falls below the set minimum, the arm O will engage the contact R, as shown in Fig. 9, and complete the alarm circuit. Likewise, if the temperature exceeds the set maximum, the expansible elements 70′ will cause arm O to engage contact Q and complete the circuit. Minor adjustments in establishing the maximum or minimum temperature may be made by rotating the knob 70 in one direction or the other. The thermostat 70′ is mounted on the incubator as shown in Fig. 1, the knob 70 being exposed exteriorly of the incubator body so as to permit easy access for the adjustment heretofore mentioned.

Figures 17, 19:
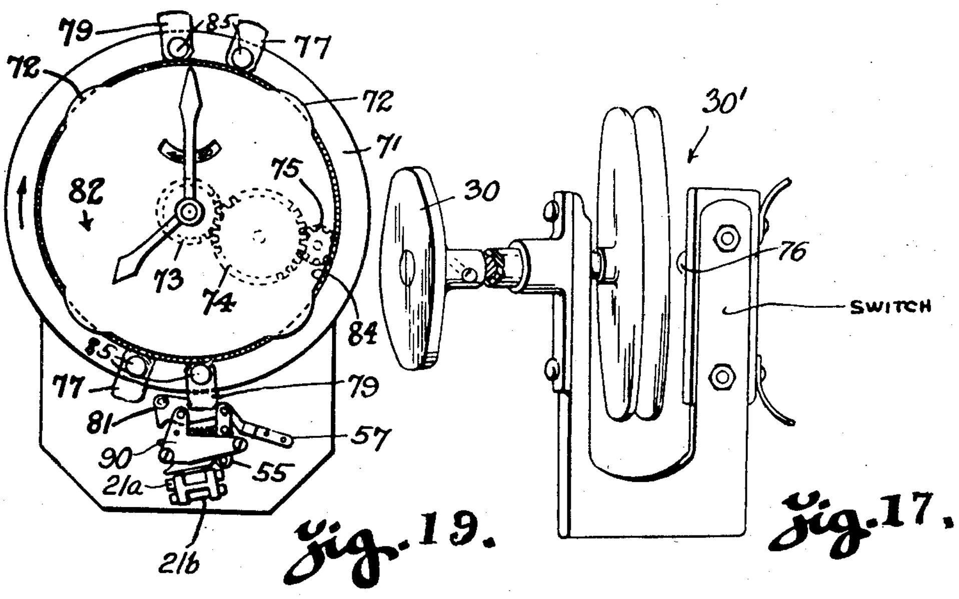
Fig. 17 is a view partly in elevation and partly in diagram of the thermostat of the temperature control mechanism.
Fig. 19 is a detail plan view of the revoluble clock rim, and mercury switch actuating mechanism carried by said rim, the clock being the same as shown in Fig. 10 but with more details shown and with the dial of the clock removed.
Figure 18:
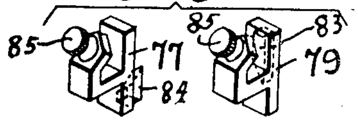
Fig. 18 is a detail perspective view of lugs 77 and 79.

Figs. 10 and 19 illustrate the time switch 21. Mercury tubes 21a—21b on the clock act in the same manner as a switch snapped from one position to the other by the clock. The mercury tubes are rotated by essentially the same type of switch mechanism shown in Figs. 4, 12, 13 and 14, except that only two mercury switches are used, being suitably mounted for simultaneous rotation. The clock motor is conventional. Wires *a* and *d* lead to the conventional time clock motor (not shown). Wires *b* and *c* lead to mercury tube 21a and wires *e* and *f* lead to mercury tube 21b. Wire *g* goes to switch 24a (see Figs. 1 and 5); wire *h* goes to ground; and wires *i* and *j* go to insulation blocks 68 shown in Fig. 5. The operation is fully automatic, requiring no winding or attention whatsoever from the operator as the clock operates by a conventional synchronous self-starting motor (not shown) direct from the lighting circuit. (See Fig. 5). In event of power failure the clock automatically restarts when power is restored.

The clock 82 has a back-geared ring 71 which is held in place by clips 72. Ring 71 has internal gear teeth 84 which are in mesh with the gear train 75—74—73. The gearing is so arranged that ring 71 makes one revolution in 24 hours. Ring 71 may carry any desirable number of pairs of lugs 77 and 79 which are detachably secured to the ring by thumb screws 85. There are preferably twelve pairs of lugs. Each of the lugs is provided rearwardly thereof with an integral beveled projection. The projection 84 on lug 77 is positioned at a lower level than the projection 83 on lug 79.

The switch mechanism includes a lever 57a which is identical to the lever 57, previously described, except that it is provided with a projecting post 81 which has a function similar to that of the connecting wire 59.

The lug 77 is adapted to cam the post 81 upwardly from its lowermost position and thereby rotate the lever 57a in a clockwise direction as viewed in Fig. 19. The lug 79 cams the post 81 downwardly and thereby rotates the lever 57a in a counter-clockwise direction.

By means of the switching mechanism heretofore described in connection with switch 28, the spaced lugs 77 and 79 cause the mercury tubes 21a and 21b to be tilted in first one and then the other direction, as the ring 71 rotates in the direction indicated by the arrow. If the lugs are equally spaced, the mercury will be tilted every hour.

Referring now particularly to Fig. 5, the electrical circuits will be described in detail.

When main switch 24 is closed, current is supplied to all of the circuits, which for purposes of clarity will be broadly classified into five separate circuits, (1) the turning circuit, which includes motor 19, (2) the heating circuit, (3) the clock motor circuit, (4) the thermostat control circuit, and (5) the fan motor circuit.

With reference to the turning circuit, the current passes through fuse 19a and up to switch 24a. Switch 24a must be closed to permit current to travel to terminal T from which it can flow through mercury tube 21a or 21b depending upon the direction of inclination of the tubes. Assuming that the clock mechanism has just tripped lever 57a so that the tubes 21a and 21b are inclined in the direction shown in Fig. 5, it follows that current will be conducted through the mercury couple in tube 21b and will not pass through 21a.

Under the conditions just described, the incubator body 1 will be at rest at its position of maximum rotation in the counter-clockwise direction. This position is indicated in Fig. 3. In this position of the incubator body, the switching mechanism of 28 will have tilted the mercury tubes 51a, 51b, and 51c so that they are inclined in the same direction as tubes 21a and 21b. This results from the action of plate 63 against screw 62 and bar 60 which, in turn, through connecting wire 59, cause the lever 57 to be rotated about pivot point 58 in a counter-clockwise direction. This, in turn, causes base 52 to be tilted as illustrated in Fig. 13, and the mercury tubes are therefore inclined in the manner aforesaid.

Current will therefore flow from tube 21b to terminal 12 in timer 21 and thence to terminal 12a in switch 28. In switch 28, two current paths are provided. One path goes through tube 51b and then to motor 19 through terminal 11a and motor terminal 5a. The other path goes to motor 19 through tube 51c, terminal 9a and motor terminal 3a.

Current travels out of the motor 19 through motor terminals 2a and 4a. The current from 4a goes to terminal 10b in switch 28 and thence through tube 51a to terminal 8a where it joins the current from motor terminal 2a. The circuit is completed by grounding through switch 24.

From the foregoing description it will be apparent that motor 19 will be energized and by means of the mechanism heretofore described, the incubator will be caused to rotate in a clockwise direction, as viewed in Figs. 1 or 3. It will continue to rotate until switch mechanism 28 is tripped causing tubes 51a, 51b, and 51c to be tilted in the opposite direction, thereby opening the above-described turning circuit.

No further rotation of the incubator will take place until the expiration of a definite time interval which is established by the spacing of the lugs 77 and 79 on the clock mechanism.

When one of the lugs causes switch mechanism 21 to be tripped, the tubes 21a and 21b are caused to be tilted or inclined in a direction opposite to that shown in Fig. 5. When thus tilted the tube 21a will complete the motor reversing circuit as follows.

Current will flow through tube 21a to terminal 7 and thence to terminal 7b in switch 28. In switch 28 two current paths are provided. One path goes through tube 51b to motor terminal 5a, in the manner previously described. The other path goes through tube 51c, to terminal 10b, and to motor 19 through motor terminal 4a. It will be noted that the entrant leads to the motor 19 are 5a—4a as distinguished from 5a—3a in the preceding circuit. This change in the motor leads causes reversal of rotation of motor 19. The current leaves motor 19 through terminals 2a and 3a. The current from 3a goes to terminal 9a in switch 28 and thence through tube 51a to terminal 8 where it joins the current from motor terminal 2a and the circuit is completed through switch 24, as previously described.

Due to the reversal of rotation of motor 19, the incubator body will rotate in a counter-clockwise direction and return to the position indicated in Fig. 3, at which position, the switch 28 will be effective to open the turning circuit. I have thus described one complete cycle of operation of the turning circuit. It will be apparent that during its rotation the incubator may be stopped in tray level position by opening switch 24a, which will interrupt the turner circuit.

The clock motor circuit is easily traced on Fig. 5, it being through fuse 19a, through the clock motor and thence to terminal 2 in 21 where it grounds through switch 24.

The heater circuit goes through fuse 19b and thence to terminal K in relay 22 where it passes through primary coil Y and is completed by terminal L to ground in switch 24. If the thermostat control circuit, hereinafter described, is calling for heat, the mercury tube 22b will be tilted so as to constitute a current path from terminal K through tube 22b, thence to terminal M and through terminal box 26 to the resistance elements 48a. The elements 48a are grounded through conductor wires leading to terminal box 26, thence to terminal N in relay 22 and is completed through switch 24.

The thermostat control circuit is a secondary circuit which is energized by the induced current in coil X of relay 22. Thus if the thermostat 30′ is not in contact with the thermosat switch (see Fig. 17), the pressure sensitive switch is closed and completes the circuit through terminal R, coil X and terminal W. The coils X and Y then repel each other, and, the coil X being pivotally movable, the tube 22b is tilted to close the heater circuit as heretofore described.

If the thermostat 30′ is in contact with the thermostat switch, the circuit through coil K is open and the coil X will assume the position shown in Figs. 5 and 8, thereby causing the tube 22b to tilt and open the heater circuit.

The fan motor circuit is connected through terminal box 26 to fuse 19b on the one side and switch 24 on the other, and is thereby completed. Thus the fan motor runs independently of the heating circuit or the thermostatic control circuit.

Before concluding this description we wish to call attention to Fig. 11 which illustrates the manner in which the egg trays 43 are held in place during the oscillation of the incubator. A longitudinal bar 43a of wood, or the like, overlies the ends of the trays adjacent to the tray corners. The bar 43a is secured to the frame of the incubator by means of a link 43b which is pivotally secured to both the frame and the bar. The weight of the bar normally causes it to be positioned in the manner shown in Fig. 11, and in this position, it prevents the trays from sliding out. However, due to the pivotal connection formed by the link 43b, the bar 43a can be raised to the dotted line position shown in Fig. 11 and in that position it no longer overlies the trays 43, thereby permitting them to be removed from the incubator.

We have thus illustrated and described an automatically controlled incubator which turns the eggs at predetermined time intervals and in which the temperature is maintained. It is recommended that the incubator be controlled to oscillate once every hour, as the Department of Agriculture has by test determined that such frequency of oscillation produces a better hatch than less frequent turning.

The rate of water evaporation within the incubator is controlled by manually adjusting the position of the heating unit 48 relative to the water tank 44 by means of the arm 50, and the rate of evaporation so established is maintained by the tilting of the conical water tank in response to loss of water.

Ventilation is obtained by means of the fan 47 and the ventilator slide 39.

What we claim is:

1. In an electric incubator, the combination of an egg container, a shaft extending through the actual center of the egg container and on which the egg container is swingably mounted, motor operated mechanism for oscillating the egg container, a clock, electrical means actuated by the clock for controlling the periodicity of oscillation, electric circuits for actuating the motor, switches in the circuits, a pendulum actuated circuit control mechanism for reversing the direction of oscillation of the container, and a pendulum-like member freely suspended from the egg container and on which the pendulum actuated circuit control mechanism is mounted for controlling said switches in said circuits as the egg container is oscillated, and adjustable means to regulate the degree of oscillation.

2. In an electric incubator, the combination of an incubator body, a shaft extending through the actual center of the incubator body and on which the incubator body is swingably mounted, motor-operated mechanism for oscillating the incubator body, electrical means for controlling the periodicity of oscillation, electric circuits for actuating the motor, switches in the circuits, a pendulum actuated circuit control mechanism for reversing the direction of oscillation of the container, a pendulum-like member freely suspended from the incubator body, said pendulum actuated circuit control mechanism including a pivotally mounted bar, stop screws adjustably mounted in the ends of said bar, a stop plate spaced from the pendulum member, a switch, a lever member operatively associated with said switch, and a link from said pivoted bar to said lever member to cause the operation of the pivoted bar and stop screws to operate said switch when the incubator body reaches a predetermined degree of oscillation, whereby to control the oscillation of the incubator body.

3. In a device of the character described, the combination of a shaft, an egg container pivotally carried by said shaft, electrically energized mechanism for oscillating said egg container about said shaft, electrically energized means for heating said egg container, and an air-conditioning unit swingably mounted on said shaft interiorly of said egg container, said air conditioning unit including a counterbalanced water tank, and said heating means being hingedly secured to said air conditioning unit in proximity to said water tank whereby said heating means may be rotated relatively to said water tank.

4. A combination, as defined in claim 3, in which said heating means is provided with a latching device whereby said heating means may be releasably locked in adjustable angularly spaced relationship to said water tank.

5. In a device of the character described, the combination of a shaft, an egg container pivotally mounted on said shaft, electrically energized mechanism for oscillating said egg container about said shaft, electrically energized means for heating said egg container, an electrically energized timer, means periodically actuated by said timer to close the electrical circuit to said mechanism, switch means operable to simultaneously open the electrical circuits to said mechanism, said heating means and said timer, and a manually operable switch connected electrically with said timer actuated means for selectively opening the electrical circuit to said mechanism when said timer-actuated means and said first-named switch means have closed the electrical circuit to said mechanism, whereby oscillation of said container may be interrupted without interrupting the operation of said heating means and said timer.

BENJAMIN H. CLEM.
JOHN W. FLAIG.

REFERENCES CITED

The following references are of record in the file of this patent:

UNITED STATES PATENTS

| Number | Name | Date |
|---|---|---|
| 798,697 | Perkins | Sept. 5, 1905 |
| 1,516,476 | Perrot | Nov. 18, 1924 |
| 1,878,503 | Martin | Sept. 20, 1932 |
| 1,197,576 | Clem | July 11, 1933 |
| 1,987,462 | Brain et al. | Jan. 8, 1935 |
| 2,078,443 | Clem | Apr. 27, 1937 |
| 2,281,339 | Taggard | Apr. 28, 1942 |
| 2,328,347 | Kuo | Aug. 31, 1943 |

FOREIGN PATENTS

| Number | Country | Date |
|---|---|---|
| 122,457 | Great Britain | Jan. 21, 1919 |